Dec. 27, 1966 R. F. BROWN, JR 3,295,118

READ-OUT CIRCUIT FOR FLUX-GATE REPRODUCER HEADS

Filed May 2, 1963

INVENTOR

Robert F. Brown, Jr.

BY Alvin J. Englert

AGENT

United States Patent Office 3,295,118
Patented Dec. 27, 1966

3,295,118
READ-OUT CIRCUIT FOR FLUX-GATE REPRODUCER HEADS

Robert F. Brown, Jr., Dallas, Tex., assignor to the United States of America as represented by the Secretary of Commerce Filed May 2, 1963, Ser. No. 277,986
3 Claims. (Cl. 340—174.1)

Figures 1, 2:
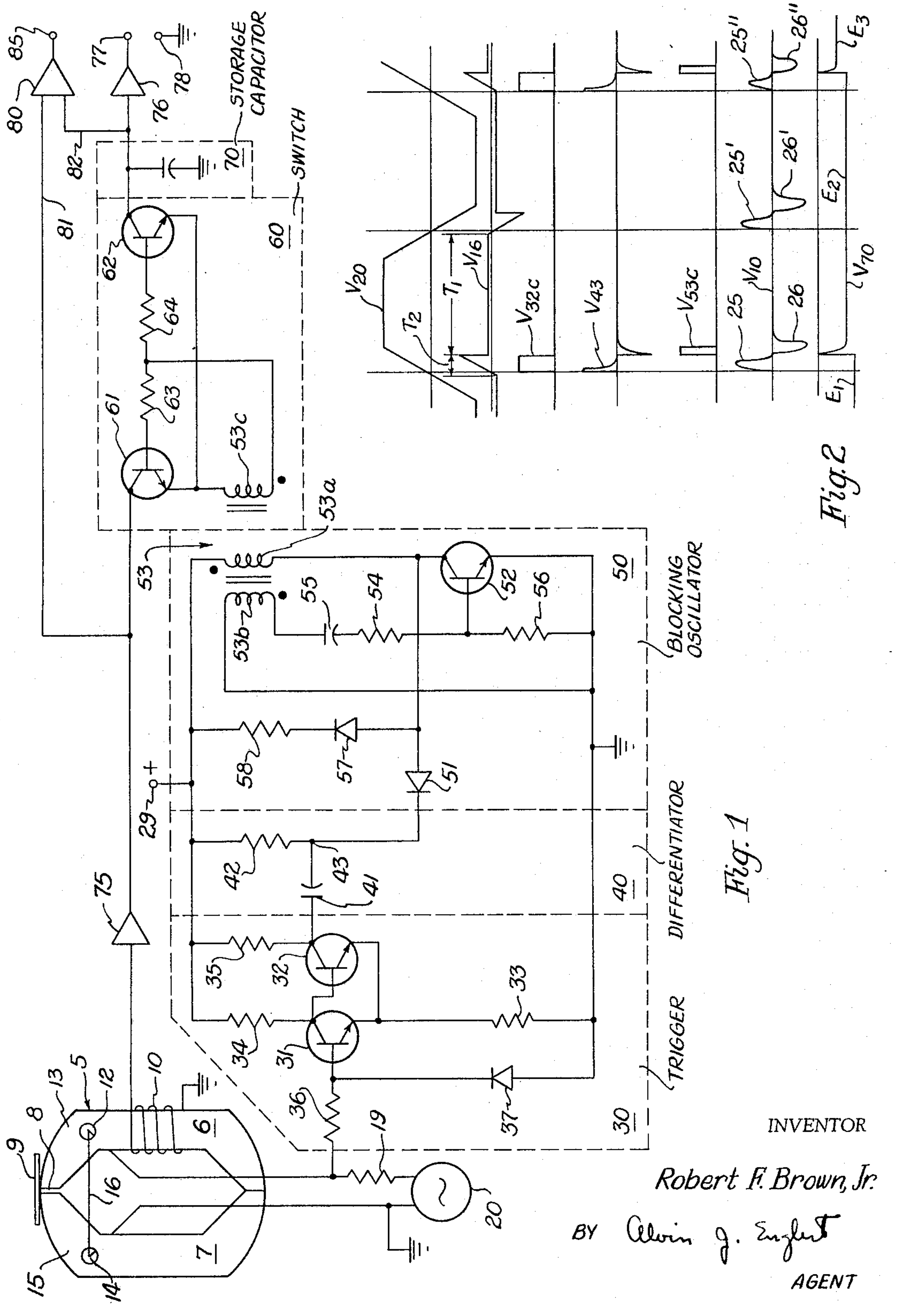

This invention relates to a read-out circuit for use with magnetic reproducer heads of the flux-gate type used in reproducing low frequency, magnetically recorded signals.

In the reproduction of low frequency, magnetically recorded signals, it is common to utilize a reproducer head of the flux-gate type, wherein a saturable portion of the magnetic path between the pick-up gap and signal winding is periodically saturated so as to introduce a rate of change in the recorded flux detected by the pick-up gap. The voltage developed by the signal winding consequently is modulated by the saturation voltage frequency and requires some form of demodulation. Heretofore it has been common to employ various modifications of known demodulation circuits to obtain a replica of the recorded low frequency signal. All of the known demodulation schemes, however, tend to drift and thereby introduce distortion and errors. In addition, the demodulation systems are relatively expensive.

In accordance with the present invention, the modulated output of the signal winding of a flux-gate head is sampled rather than demodulated in the usual sense. The sampling is accomplished by providing a transistor switch that is synchronized with the flux-gate drive and arranged to connect the signal winding to a storage circuit during appropriate portions of the modulated signal output. The storage circuit is clamped after each sampling period, and consequently there is no tendency for the storage circuit output to drift with respect to the originally recorded signal. By driving the flux-gate and synchronized switch at a high repetition rate, it is possible to achieve excellent approximations by the sampling technique. The sampling read-out circuit of the present invention moreover is relatively inexpensive, compact, rugged, and dependable.

Accordingly, it is an object of this invention to provide a read out-circuit for flux-gate heads which samples the output signal thereof.

Another object is to provide a read-out circuit that stores selected portions of a flux-gate head output to construct a replica of low frequency magnetically recorded signals.

These and other objects and features and advantages of the present invention will be better understood by reference to the accompanying specification and drawing, wherein:

FIG. 1 is a schematic diagram illustrating the principles of the present invention; and FIG. 2 is a family of curves representing the waveforms at various points in the diagram of FIG. 1.

In FIG. 1 there is illustrated a magnetic reproducer head 5 of the flux-gate type, having opposed leg portions 6, 7 arranged at one end to form a pick-up gap 8 for detecting the magnetic flux carried by a magnetic recording member 9 such as tape, wire, or the like. Disposed on the leg portion 6 is a signal winding 10, which in practice is also wound, in additive fashion, on leg portion 7, the latter turns being omitted from FIG. 1 for sake of clarity. Between the pick-up gap 8 and signal winding 10, the leg portions 6, 7 are drilled to provide holes 12, 14 that receive a single-turn drive coil 16 which provides the flux-gate action. When the current in drive coil 16 is less than the value which causes the saturable portions 13, 15 surrounding the holes 12, 14 to saturate, flux from the magnetic recording 9 follows the path provided by the leg portions 6, 7 and thereby links the signal winding 10. However, when the current in drive coil 16 is sufficient to saturate the saturable portion 13, 15, the flux from the magnetic recording 9 is constrained to the region near the air gap 8, and cannot link the signal winding 10. For further details concerning the construction and operation of flux-gate head 5, reference may be had to the prior art, of which U. S. Patent 2,905,-770 is exemplary.

In accordance with the present invention, the drive coil 16 of flux-gate head 5 of FIG. 1 is connected via a current-limiting resistor 19 to an alternating-voltage source 20. As will become apparent hereinafter, sampling pulses are generated in signal winding 10 each time the voltage of surce 20 passes through zero. Hence, it is desirable that the frequency of source 20 be many times higher than the highest frequency to be reproduced from the recording 9 so as to obtain many samples per cycle of recorded signal. The waveform of the source 20 is not critical, the only requirement being that the magnitude of the slopes of the voltage wave at the zero voltage points be as large as possible. The preferred waveform therefore is trapezoidal, generated in the conventional manner by clipping the peaks of a sine wave of large magnitude. Such a waveform is illustrated by the curve $V_{20}$ of FIG. 2.

When the voltage of source 20 is zero or very small, the current through drive coil 16 is also small, and the saturable portions 13, 15 are unsaturated. Consequently, the voltage across drive coil 16 is inductive, and relatively large. As the voltage of source 20 increases in magnitude, the current through and voltage across drive coil 16 also increases, until the saturable portions 13, 15 saturate, at which time the voltage across the drive coil 16 drops to a very low value corresponding to the resistive voltage drop thereacross. This behavior of the voltage across drive coil 16 is illustrated by curve $V_{16}$ of FIG. 2. It will be noted that the voltage $V_{16}$ is periodic, being low for a long time interval $T_1$ corresponding to the saturated condition of the saturable portions 13, 15, after which the voltage increases in magnitude (ignoring polarity) as the saturable portions unsaturate. The unsaturated condition exists for a time interval $T_2$ which is much shorter than the saturated time interval $T_1$. After the expiration of the time interval $T_2$, the saturable portions again saturate, essentially in zero or negligible time if the hysteresis loop of the head material is essentially "square," which is in accordance with common practice in constructing such heads. Comparing $V_{16}$ with $V_{20}$, it will be seen that every time $V_{20}$ goes through zero, the saturable portions 13, 15 unsaturate briefly and then quickly return to the saturated condition.

Referring now to the signal winding 10, it will be readily appreciated that the above-described periodic action of brief unsaturation followed by saturation of the saturable portions 13, 15 causes the flux of magnetic recording 9 to rapidly link and then unlink the signal winding 10. In accordance with Lenz's law, this increase and decrease of flux linkages develops a closely-spaced pair of voltage pulses of opposite polarity in the signal winding 10 as illustrated by the curve $V_{10}$ in FIG. 2. The magnitudes of the pulses 25, 25′, 25″ of $V_{10}$ due to the unsaturation action depend on the magnitudes of the recorded flux at the times of the unsaturation action, and on the rapidity of the unsaturation action (rate of change of permeability). Since the rapidity factor is essentially the same during each unsaturation action, the magnitudes of the pulses 25, 25′, 25″ vary only with the magnitudes of the recorded flux at the times of the unsaturation action. Thus, the envelope of the pulses 25, 25′, 25″ would constitute an approximation of the original signal recorded as varying flux in the magnetic record 9. Before proceeding with the means for constructing such an envelope, however, it should be noted that the comments concerning pulses 25, 25′, 25″ apply equally to the companion pulses 26, 26′, 26″ that are generated by the action of saturation of the saturable portions 13, 15. That is, the envelope of pulses 26, 26′, 26″ would also constitute an approximation of the recorded signal. In addition, it should be noted that a reversal of the recorded flux (due to the recording of negative-going signals) would simply invert both of the pulse pairs such as 25 and 26.

In accordance with the present invention, either of the pulse chains 25, 25′, 25″ or 26, 26′, 26″ of $V_{10}$ of FIG. 2 are applied to a sampling capacitor to construct a continuous signal output. Thus, it is necessary to switch one of the pulse pairs (25, 26) to the capacitor, while rejecting the other. It is preferable to utilize the second of the pulse pairs (the chain 26, 26′, 26″) due to the saturation action because, as will become more apparent hereinafter, the abrupt discontinuity in $V_{16}$ (FIG. 2) due to the saturation action can be detected more quickly than the less abrupt discontinuity due to the unsaturation action, thereby providing a more stable time reference from which to operate the switch. For this reason, the circuit illustrated in FIG. 1 selects these second pulses 26, 26′, 26″.

In FIG. 1, the drive coil voltage is applied to a trigger circuit 30 which squares the waveform of the drive coil voltage, the squared waveform then being differentiated by a differentiator 40 to provide two triggers corresponding to the rising and falling sides of the squared waveform. The second trigger therefore indicates saturation of the saturable portions 13, 15 as desired, and can be applied to a blocking oscillator 50, which in turn operates switch 60. Each of these circuits 30, 40, 50 and 60 will now be described in detail.

The trigger circuit 30 includes two n-p-n transistors 31, 32 each operated in common emitter fashion. The emitter of transistor 31 is connected to ground via a biasing resistor 33 of small value, while the collector thereof is connected to a source 29 of positive voltage via load resistor 34. The emitter and base of transistor 32 are tied to the emitter and collector, respectively, of transistor 31; and the collector of transistor 32 is connected via load resistor 35 to the positive supply 29. The base of transistor 31 is connected to the voltage across the drive coil 16 by means of a current-limiting resistor 36.

In operation, when the voltage $V_{16}$ is at the low value corresponding to saturation of the saturable portions 13, 15, the application of this voltage to the base-emitter circuit of transistor 31 has no effect, inasmuch as the connection of the base of transistor 32 to the positive supply 29 via resistor 34 holds transistor 32 on, causing sufficient voltage to be dropped across the biasing resistor 33 to bias transistor 31 off. However, when voltage $V_{16}$ begins rising positive as the saturable portions 13, 15 unsaturate, this bias on transistor 31 is overcome, and transistor 31 begins conducting, causing the voltage on its collector and the base of transistor 32 to fall. This falling action turns transistor 32 off, whereby the voltage $V_{32c}$ on the collector of transistor 32 rises, as shown by the curve $V_{32c}$ in FIG. 2. When the voltage $V_{16}$ later falls due to saturation of saturable portions 13, 15 the base-emitter voltage of transistor 31 is insufficient to maintain substantial conduction therein, whereby the voltage on the collector of transistor 31 and base of transistor 32 rises, causing transistor 32 to again conduct, whereby the voltage $V_{32c}$ again falls, forming a voltage waveform that is essentially a squared replica of the triangular waveform $V_{16}$.

As shown in FIG. 2, the voltage $V_{32c}$ is generated only for each of the positive waveforms of drive coil voltage $V_{16}$, since the trigger circuit 30 responds only to positive inputs. To protect transistor 31 from the negative portions of $V_{16}$, the diode 37 is provided to shunt the base of transistor 31 to ground for negative voltages. It should be noted that the start of $V_{32c}$ is slightly delayed with respect to the unsaturation discontinuity in $V_{16}$, while there is substantially no delay in the end of $V_{32c}$ with respect to the saturation discontinuity in $V_{16}$.

The square waveform $V_{32c}$ is applied to the differentiating circuit 40 to obtain triggers corresponding to the rising and falling edges thereof. This differentiating circuit comprises the series combination of capacitor 41 and resistor 42 connected between the collector of transistor 32 and the positive supply 29, an output 43 being taken at the junction between the capacitor and resistor. This output is illustrated by curve $V_{43}$ in FIG. 2. The operation of the circuit is based on the fact that the voltage across capacitor 41 cannot change instantaneously. Hence, when the collector voltage $V_{32c}$ suddenly rises, the differentiator output voltage $V_{43}$ likewise suddenly rises, but then quickly recedes to its steady state value (the value of supply 29) in an exponential fashion; and when the collector voltage $V_{32c}$ then suddenly decreases, $V_{43}$ also suddenly decreases, only to return to the steady state value again.

As mentioned previously, the second or negative trigger of $V_{43}$ is used to trigger blocking oscillator 50. In order to pass this trigger and block the positive trigger, a diode 51 is connected between the differentiator output 43 and the input collector of blocking oscillator transistor 52, the cathode of diode 51 being connected to the output 43 so as to present a low impedance only for the negative trigger. The n-p-n blocking oscillator transistor 52 is connected in common-emitter fashion, with a first winding 53*a* of a conventional blocking oscillator transformer 53 in the collector load circuit. The second winding 53*b* of the transformer is connected to provide positive feedback to the base of the transistor 52. Hence, the positive terminal of winding 53*b* is connected via the resistor-capacitor network 54, 55 to said base, while the negative terminal of the winding is connected to ground. The base of transistor 52 is additionally provided with a leak resistor 56.

In operation, the negative trigger passed by diode 51 tends to lower the voltage on the collector of transistor 52 and the negative terminal of winding 53*a*, whereby the positive terminal of winding 53*b* tends to rise and apply sufficient base-emitter voltage to turn transistor 52 on. As transistor 52 beings conducting, the collector voltage drops further, thus developing more positive feedback voltage on the base. In this manner, the collector current in transistor 52 is rapidly raised to large values. After a time interval dependent on the circuit parameters, particularly the transformer 53, resistor 54 and capacitor 55, the collector current ceases to increase, whereby the feedback voltage is no longer generated, tending to lower the base voltage and cause transistor 52 to cease conducting. As the transistor 52 starts to turn off, the collector voltage rises, whereby the feedback network further lowers the base, thereby accelerating the turn-off action. To prevent the circuit from oscillating when the collector voltage reaches its most positive value, the collector of transistor 52 is connected to the anode of a diode 57 which in turn is connected to a damping resistor 58 connected to the positive supply 29, whereby any overshooting positive voltage on the collector is quickly absorbed. In this manner, the above-described negative trigger initiates a sharp pulse of current of controllable width through the transformer winding 53*a*.

As shown in FIG. 1, the transformer 53 has a third winding 53*c* which is connected to operate a switch 60. This switch includes a pair of n-p-n transistors 61, 62 the emitters of which are tied together, so that the collectors comprise the two switch terminals. That is, the switch path is through the collector-emitter circuit of transistor 61 and thence through the emitter-collector circuit of transistor 62. To render these emitter-collector circuits from their normally high impedance states to their low impedance states, the base-emitter circuits of the transistors 61, 62 are each connected via current-limiting resistors 63, 64 across the third winding 53*c*, with the positive terminal of winding 53*c* nearer the bases. Thus the above-described current pulse developed by blocking oscillator 50 which tends to lower the negative terminal of winding 53*a* simultaneously raises the positive terminal of winding 53*c*, thereby applying sufficient positive voltage to the bases of transistors 61, 62 to render their emitter-collector circuits to the low impedance states. This switching voltage of the blocking oscillator, the voltage across winding 53*c*, is illustrated by the curve $V_{53c}$ in FIG. 2. It will be noted that the widths of these switching pulses $V_{53c}$ are adjusted so as to terminate substantially when the signal pulses 26, 26″ developed across the signal winding 10 reach their peak or maximum value.

As shown in FIG. 1, the switch 60 connects the signal winding 10 across a storage capacitor 70. The storage capacitor 70 preferably is large enough to retain substantially all of the pulse 26 ($V_{10}$ in FIG. 2) until the next pulse 26″ is applied thereto. To enable capacitor 70 to charge rapidly, it is desirable to lower the effective impedance of the signal winding 10 by inserting a low output impedance amplifier 75, such as a cathode-follower amplifier or the like, between the signal winding 10 and the switch 60.

The voltage across the storage capacitor 70 is illustrated by the curve $V_{70}$ in FIG. 2. It will be observed that this voltage has some previously-determined value $E_1$ until the start of the switching pulse $V_{53c}$, at which time the voltage $V_{70}$ is reduced essentially to zero. The voltage $V_{70}$ goes to zero because the switching pulse $V_{53c}$ closes the switch 60, placing the capacitor 70 across signal winding 10 whose voltage $V_{10}$, FIG. 2, is zero at the instant saturation starts. As described above, the saturation action rapidly generates the increasing (magnitude) pulse 26 of $V_{10}$. When this pulse reaches its peak value, the switching pulse $V_{53c}$ terminates, causing switch 60 to open so that capacitor 70 may retain the new sample voltage $E_2$. In similar fashion, the switch 60 is closed and opened for the pulse 26″, causing the capacitor voltage $V_{70}$ to assume still another sample voltage $E_3$. In this manner, the capacitor voltage $V_{70}$ provides a highly accurate, drift-free approximation or replica of the signal recorded on the recording member 9 of FIG. 1.

In utilizing the voltage $V_{70}$ across capacitor 70, a high input impedance amplifier 76, FIG. 1, should be connected between the capacitor and load terminals 77, 78, to prevent any loading of the capacitor 70. Preferably, however, the load is connected to terminals 85, 78, wherein terminal 85 is the output of a differential amplifier 80 having inputs 81, 82 connected to both sides of the switch 60. It will readily be appreciated that any low frequency noise generated in signal winding 10 or in amplifier 75 will appear at both sides of the switch 60, and hence at both of the inputs 81, 82 of the differential amplifier 80. Input 82 of course also contains the sampling signal information $V_{70}$, while input 81 contains no information since the pulse pairs 25, 26 applied thereto are equal and opposite and thereby average to zero. Hence, input 81 is substantially only noise and input 82 is the same noise plus information, whereby the subtraction of these inputs by the differential action of amplifier 80 provides a noise-free output at terminal 85.

While particular embodiments of the invention have been shown, it will be understood that other modifications will now be apparent to those skilled in the art. It is therefore intended to cover any such modifications as fall within the scope of the appended claims.

What is claimed is:

1. A read-out circuit for use with a magnetic reproducer head having a pick-up gap, signal winding, and at least one saturable portion comprising, means for alternately driving said saturable portion into the saturated condition for a first time interval and into the unsaturated condition for a second time interval, means for storing signals, a pulse-operable switch connected between said signal storing means and said signal winding, means for generating a switching pulse which starts substantially when said saturable portion is driven into one of said conditions and which terminates substantially when the signal pulse developed in said signal winding by the action of said saturable portion being driven into said one of said conditions is at its maximum value, said pulse-operable switch being closed in response to said switching pulse, and means for connecting a load circuit to said signal storing means.

2. A read-out circuit as set forth in claim 1, wherein said saturable portion is saturated by a drive coil connected to said driving means, said switching pulse generating means comprising means connected across said drive coil for squaring the drive coil voltage waveform, means for differentiating the output of said squaring means to provide first and second triggers, and oscillator means responsive to the trigger corresponding to said one of said conditions for generating said switching pulse.

3. A read-out circuit as set forth in claim 1, wherein said load circuit connecting means comprises a differential amplifier having inputs connected to both sides of said pulse-operable switch.

References Cited by the Examiner

UNITED STATES PATENTS 3,150,358 9/1964 Newman et al. ------ 340—174.1

BERNARD KONICK, *Primary Examiner.*

V. P. CANNEY, *Assistant Examiner.*